Jan. 15, 1957     J. A. MANAHAN     2,777,646
EXPANSIBLE-CONTRACTIBLE HOSE REEL
Filed July 5, 1952     2 Sheets-Sheet 1

Inventor
Joseph A. Manahan
by Roberts Cushman & Grover
att'ys.

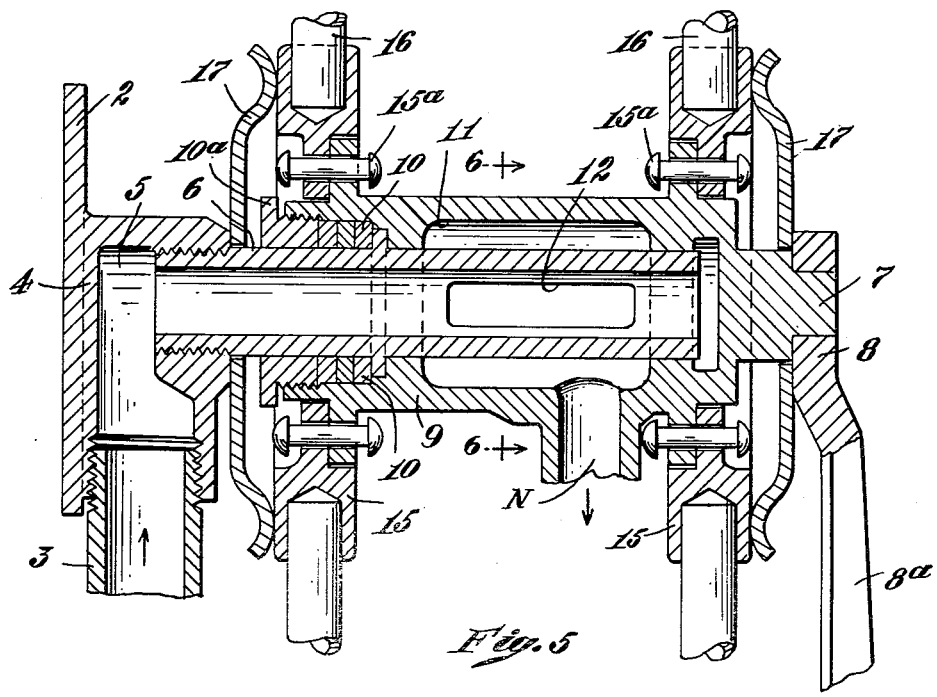
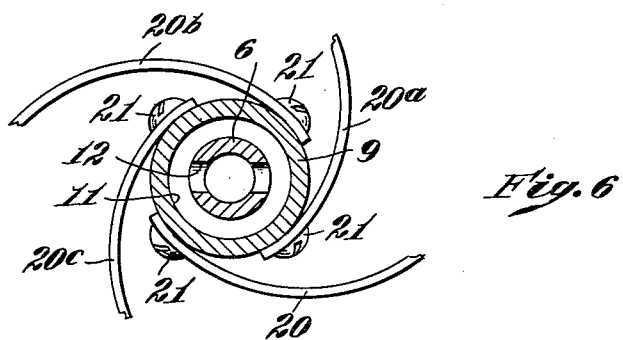
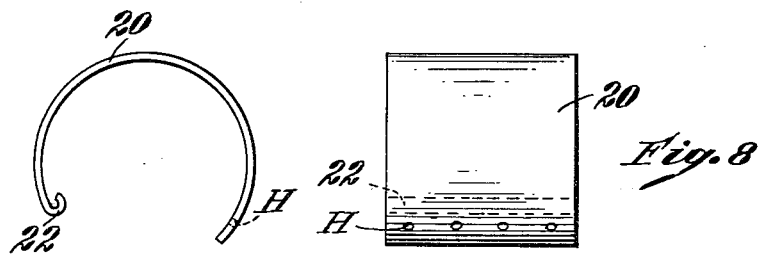

United States Patent Office 2,777,646
Patented Jan. 15, 1957

2,777,646

EXPANSIBLE-CONTRACTIBLE HOSE REEL

Joseph A. Manahan, Newton Highlands, Mass.; Dorothy Manahan, administratrix of said Joseph A. Manahan, deceased Application July 5, 1952, Serial No. 297,224

11 Claims. (Cl. 242—86)

This invention pertains to reels for collapsible fire-hose, more especially to reels designed to permit flow of water through the hose while the latter is wound on the reel. Fire hose attached to interior standpipe systems, or hose outlets, is collapsed and substantially flat when not in use, and ordinarily must first be unwound from the reel (or unfolded from the rack on which it is stowed) before the water can be safely turned into the hose from the standpipe or hydrant. This operation of unwinding or unfolding causes considerable delay at the most critical time, when the fire is of small proportions and when it is of the utmost importance that a stream of water or fog be instantly available. To avoid such delay, reels have heretofore been devised which permit the hose to remain attached to the hydrant while coiled and not in use, and which allow the coiled hose to expand when the water is turned on, thus permitting the delivery of a stream from the hose nozzle before the hose is unwound. To allow this action, it is requisite that the drum or other structure about which the hose is wound be capable of a decrease in effective diameter as the water expands the hose. Preferably, also, the effective length of the drum should, at the same time, increase to accommodate any expansion of the coiled hose axially of the reel.

The patents to Craig, No. 2,010,811 and No. 2,426,984, describe reels of this general type wherein the heads of the reel are capable of relative axial movement, and wherein the structure on which the hose is wound comprises independent, spaced, parallel rods or rungs capable of moving bodily inward toward the axis of the reel in response to the pressure of the inflating hose. In the reel of the Craig patent (in common with other reels of this general type) the rods or rungs which support the coiled hose are widely spaced circumferentially, for example, 45° apart, and between them the hose is unsupported. When wound on such a collapsible structure, the hose tends to extend in substantially straight runs from one rod to the next, bending rather sharply where it crosses each rod, so that the convolutions of the coiled hose are not smoothly helical as they would be were they wound about the peripheral surface of a solid cylindrical drum. At each point where the hose contacts one of the supporting rods it is under substantial radial pressure from the superposed coils, and when the water is turned on these sharply bent, compressed portions of the hose offer very substantial resistance to the flow of water. This substantially delays the passage of water through the hose, tends to restrict the flow and cut down nozzle velocity, and places a great strain on the material of the hose such as may result in bursting, if the hose is not in the best of condition.

It has heretofore been proposed to remedy the above defect by providing segmental, arcuate drum elements so arranged as collectively to provide a substantially complete cylindrical drum surface, said arcuate elements being capable of radial movement so that the effective diameter of the drum may decrease in response to expansion of the hose. However, in every such device known to me the reel structure is so complicated as to be very expensive and involves the use of rigid, radial guide elements, exposed coil springs, etc., which are subject to clogging by dirt and dust and to rusting, so that in order to keep the reel in effective operative condition it must be disassembled at frequent intervals for cleaning, inspection and repairs.

When water is admitted to a hose line, particularly to hose of the size used in fire fighting, a powerful force is developed tending to straighten the hose, and if the hose is not substantially straight when the water is turned on, the nozzle will lash or kick with a force so great as may cause serious injury to the person trying to hold the nozzle. For this reason firemen are cautioned to unfold and straighten the hose before turning on the water. Because inexperienced persons are not aware of this danger, fire departments have, in many instances, forbidden the use of hose racks or reels in buildings. The present invention has for one of its objects the provision of a hose reel so devised that the admission of water to the hose, while on the reel, will not develop a dangerous kick at the nozzle end.

A further object is to provide a reel of the above type comprising an expansible-contractible hose-supporting structure, the reel also preferably being capable of axial expansion or contraction, the hose-supporting structure being so devised as to provide a substantially uninterrupted and approximately cylindrical peripheral surface about which the hose is wound. A further object is to provide a reel having the above characteristics which is of very simple and inexpensive construction, light in weight and but little subject to deterioration, and which, at the same time, is durable, dependable and effective for its intended purpose. A further object is to provide a reel wherein the hose-supporting structure consists of a plurality of overlapping resilient elements, each rigidly fixed at its inner end to a hub and having its outer end free to move radially in or out. A further object is to provide a reel wherein the hose-supporting surface consists solely of a series of resilient, arcuate spring leaves which normally extend substantially from one head to the other of the reel and which have smooth, substantially cylindriform, hose-contacting outer surfaces. A further object is to provide a reel having spaced heads each capable of axial movement along the hub, with spring means of very simple form urging the two heads toward each other. Other and further objects and advantages of the invention will be pointed out in the following more detailed description and by reference to the accompanying drawings wherein Fig. 1 is a front elevation of the reel of the present invention, showing a length of hose coiled thereon, the hose being shown as inflated as it is when the water is turned on;

Fig. 5 is a fragmentary section, to larger scale than Fig. 1, in the vertical axial plane of the reel hub, and showing portions of the supporting bracket;

Fig. 6 is a fragmentary section on the line 6—6 of Fig. 5, showing the central part of the reel;

Fig. 7 is an end elevation, to smaller scale, of one of the reel arms; and

Fig. 8 is a front elevation of the arm shown in Fig. 7.

Figure 2:
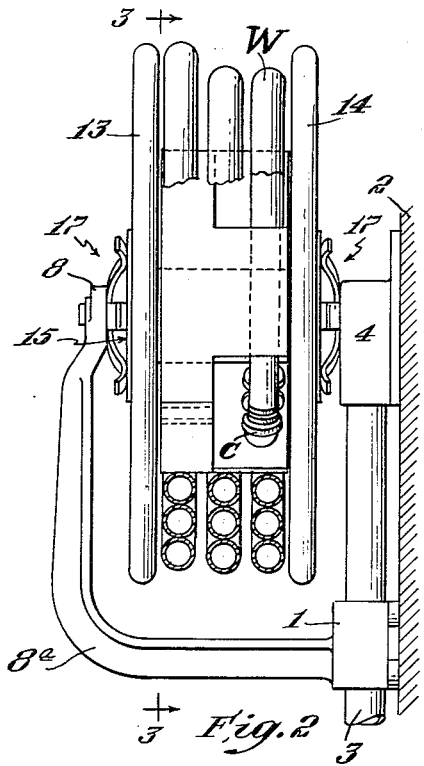
Fig. 2 is a side elevation of the reel shown in Fig. 1 with portions broken away and in section to show interior structure.

Referring to the drawings, the numeral 1 designates a bracket which may be secured to a vertical support 2, for example, the wall of a building, the bracket having a vertical passage for the reception of the upper part of a water supply standpipe 3, the upper end of which is screw threaded into the lower part of a second bracket 4 also attached to the support 2 and which has an interior chamber 5 (Fig. 5) which always communicates with the standpipe 3. The outer wall of this chamber 5 is provided with a screw-threaded aperture into which is screwed one end of a stationary horizontal pipe 6 whose outboard portion forms a shaft on which turns the reel hub 9. This reel hub comprises a journal portion 7 (Fig. 5) which turns within a horizontal bore in the upper end 8 of the arm 8$^a$ (Fig. 2) projecting from and forming a part of the bracket 1. The reel hub 9, which is tubular, has an intermediate bearing portion which turns on the horizontal pipe 6. Packing 10 is held in a stuffing box in the left-hand end of hub 9 by a gland 10$^a$ and is operative to prevent leakage between the pipe 6 and the hub 9. The hub 9 has an interior chamber 11, intermediate its ends, which is always in communication with the interior of the pipe 6 by means of an elongate slot 12 in the wall of the pipe 6. A nipple N (Fig. 5) projects from the hub 9, the interior of the nipple always communicating with the chamber 11.

Mounted on the opposite end portions of the hub 9 are the reel heads 13 and 14 (Fig. 2) which are alike, each, as here illustrated, comprising a hub portion 15 (Fig. 5) which is connected to a rim portion by radial spokes 16.

Figure 4:
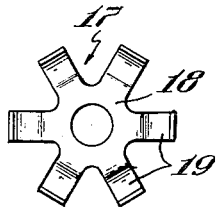
Fig. 4 is an elevation of one of the springs used for urging the reel heads toward each other.

These reel heads 13 and 14 are arranged to slide axially on the reel hub 9, the sliding movement being limited by long rivets 15$^a$ (Fig. 5) and are urged toward each other by resilient washer members or spring spiders 17, each having a hub portion 18 (Fig. 4) which has a central opening and each having radiating arms 19 which are so bent as to provide substantial spring action, the hub portions bearing at their outer sides against the inner surfaces of the members 4 and 8, respectively, while the arms 19 bear against the parts 15 thus resiliently pressing the heads toward each other. The reel is thus permitted to expand axially as limited by rivets 15$^a$ in response to expansion in this direction of hose wound on the reel.

Figure 3:
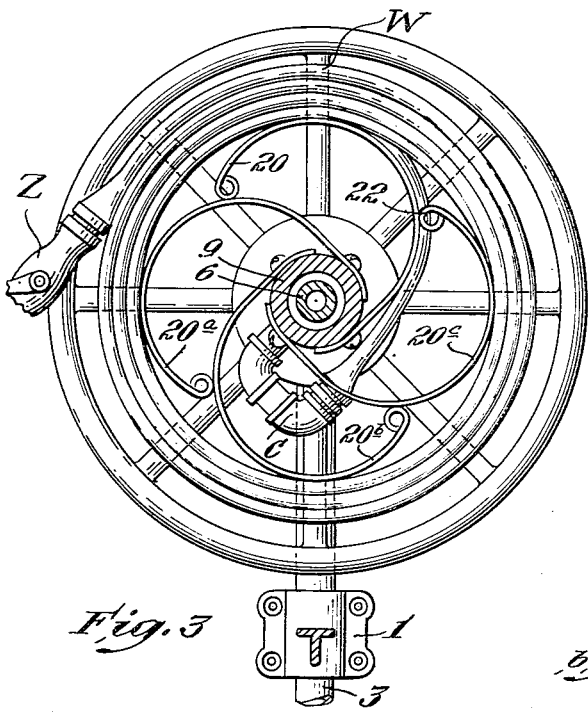
Fig. 3 is a section substantially on the line 3—3 of Fig. 2, but showing the hose in its normally collapsed condition.

The drum portion of the reel on which the hose is wound consists of a series of resilient arms or spring leaves 20, 20$^a$, 20$^b$, 20$^c$, etc. (Fig. 3), here shown as of sheet metal of uniform thickness, four such leaves being here shown, although it is within the scope of the invention to employ a greater number if desired. Each of these spring leafs is of arcuate curvature (Fig. 7), here shown as of approximately 270° of circular curvature, although it is not essential that the curvature be circular or of this arcuate extent. Near one edge each leaf is provided with a series of holes H (Fig. 8) for the reception of screws 21 (Fig. 6) by means of which this edge portion of each leaf is rigidly secured to the reel hub 9. Preferably the opposite, outer or free end of each leaf is curled or otherwise provided with a smoothly rounded bead 22. As here illustrated, each leaf 20, 20$^a$, etc., is of a width to extend substantially from one of the heads to the other of the reel when the heads are in their normal position. However, it is contemplated that, if desired, each arm may consist of two or more independent members (each like one of the leaves here shown, but narrower), each secured at one end to the shaft and having its other end free, the several such members collectively extending substantially from one head to the other.

As shown, the convex surface of each of the reel arms is outermost, and they are of such dimensions and so arranged that the free beaded edge 22 of each arm overlies and usually contacts the convex outer surface of the next arm of the series, the normal point of contact, as here illustrated, being substantially midway between the ends of the arm. However, this exact arrangement is not essential.

Figure 1:
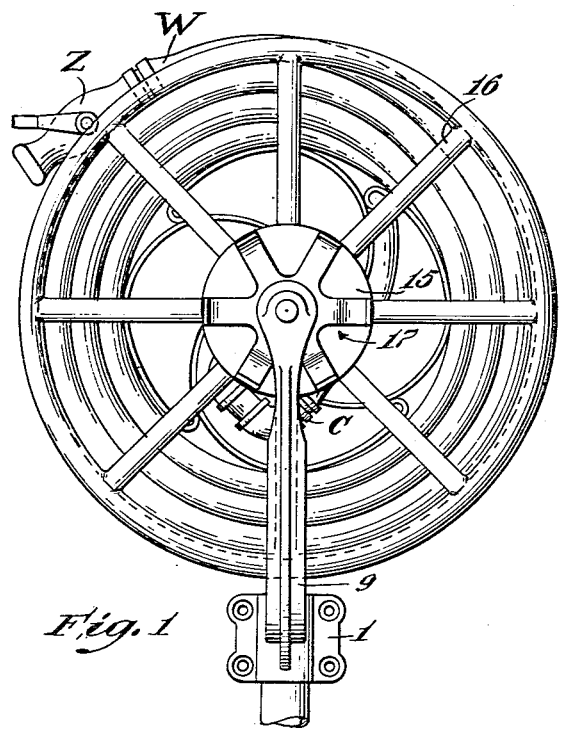

A hose coupling C (Figs. 1, 2 and 3) is connected to the nipple N, one leaf 20$^b$, as here shown (Fig. 3), being provided with a slot or cutaway portion for the passage of this coupling. To this coupling the inner end of the hose W is connected, and this connection need not be disturbed during the use of the reel. As here illustrated, the next arm 20$^c$ of the series likewise has a slot or cutaway portion for the passage of the hose, which extends from the coupling C. The arm 20 is the first one of the series, as here shown, whose outer surface is contacted by the hose, the latter then extending in a helix about the outer surface of the next arm 20$^a$ and so on, being wrapped in concentric coils with the nozzle Z at the outside in convenient position to be grasped preparatory to use.

With the resilient arms thus arranged, the hose is supported throughout the greater portion of the circumference of the drum, and the surfaces against which it rests are of substantial circumferential extent and of so large a radius of curvature that there is little, if any, tendency for the hose to sag between its points of contact with two successive arms. When the water is turned on and the hose begins to inflate or expand diametrically, the arms of the reel tend to assume curvatures of greater radii than normal, the beaded edge 22 of each arm sliding along the curved outer surface of the next arm of the series so that the effective diameter of the hose-supporting structure decreases as the hose swells out. With this arrangement the hose is not normally compressed or flattened locally so that when the water is turned on it is free to flow through the coils of the hose without meeting substantial restriction or obstruction, and thus the full stream is delivered from the nozzle with very little delay after the water is turned on. Furthermore, because there are no sharp bends or constrictions in the coils of hose, the hose is not subjected to undue pressure when the water is turned on and thus is less subject to damage than when reels of usual prior construction are employed.

In the use of the reel herein disclosed, it has been noted that the nozzle end of the hose shows little tendency to kick or lash when the water is turned on. The reason for this is not fully understood but it is believed that the arrangement of the passages leading from the standpipe to the hose and particularly the fact that the axis of the coupling C is substantially tangent to the curved surface of that leaf 20 of the reel with which the hose first contacts, may be a contributing factor at least to this desirable action.

It may be noted that in the present arrangement the expansible, contractible, hose-supporting structuring consists of but four elements (in addition to the shaft), that is to say, the four resilient spring arms or leaves. No guides are necessary for controlling the movement of the arms as the supporting structure expands or contracts, and there are no coiled springs or similar devices subject to the collection of dirt or deterioration from rust. The spring arms here employed may, for example, be of sheet stainless steel so that they will not rust, even though subjected to water-containing mineral salts or chemical substances, and thus while the reel is extremely simple it is at the same time durable and reliable and ready at an instant's notice to deliver a stream of water at substantially full supply pressure.

As here illustrated, the reel shaft is mounted at right angles to the support or wall 2 and can not be swung horizontally, but it is contemplated that the supporting bracket may be so arranged as to permit horizontal swing of the reel shaft, for example as is illustrated in the patent to Montgomery, No. 994,025, May 30, 1911, it being within the province of the skilled mechanic to provide a swinging reel shaft of the general type illustrated in the Montgomery patent.

It is also contemplated that, if desired, the reel may be arranged with its shaft vertical, and, in that event, the shaft 9 may be mounted as an axial continuation of the standpipe 3, with proper provision for the rotation of the shaft so that the shaft will turn about a vertical axis instead of about a horizontal axis.

Obviously various adjunctive features may be associated with the reel, for example, lamps to indicate its location or to facilitate its use; automatic alarms, etc., but such features form no part of the present invention.

While one desirable embodiment of the invention has been illustrated by way of example, it is to be understood that the invention is broadly inclusive of any and all modifications falling within the scope of the appended claims.

I claim:

1. A fire hose reel comprising a hub, spaced heads, and a series of resilient arms arranged between the heads, each arm of the series being fixed at one end to the hub and being free at its other end, each arm being of arcuate curvature with its convex side outwardly exposed, successive arms of the series overlapping, the outer convex surfaces of the several arms collectively constituting a support for the hose.

2. A hose reel of the class described having a hose-supporting structure consisting of a series of radiating, resilient arms, each arm being a unitary piece of sheet metal, each arm being fixed at its inner edge and having its outer edge free to move, the arms being so bent that the outer edge of each arm overlies and normally contacts another arm of the series.

3. A hose reel including a hub and a hose-supporting structure carried by the hub, the supporting structure comprising a plurality of curved, resilient spring leaves each fixed at one edge to the hub and being free at its opposite edge, each arm being arcuately curved with its convex side outwardly exposed, the free edge of each arm overlying the outer surface of the next adjacent arm, the convex outer surfaces of the several arms collectively forming a support for the coiled hose.

4. A hose reel including a hub and a hose-supporting structure carried by the hub, the supporting structure consisting of a plurality of unitary resilient arcuate arms each fixed at one end to the hub and having its opposite end free to move and overlying and normally contacting the outer surface of the next adjacent arm, the convex surfaces of the several arms being outermost and collectively constituting a support for the coiled hose.

5. A hose reel of the class described having a hose-supporting structure consisting of a series of radiating, resilient unitary arms, the inner edges of the several arms being parallel and arranged in spaced relation in a circle, said inner edges of the arms being relatively fixed, each arm being arcuately curved with its convex side outwardly exposed, the opposite edges of the several arms being free to move, each arm being so normally curved that its free outer portion overhangs the next adjacent arm of the series the convex outer surfaces of the arms collectively constituting the hose-supporting surface of the reel.

6. A hose reel of the class described having a hose-supporting structure consisting of a series of radiating, resilient arms, each arm being a unitary length of spring metal the inner edges of the arms of the series being parallel and arranged at equal distances about a circle, said inner edges of the arms being relatively fixed and the opposite edges of the arms being free to move, the free edge of each arm overlying the next adjacent arm of the series, each arm being arcuate and of variable radius of curvature with its convex surface outermost and normally of minimum radius, said convex surfaces collectively constituting a support for a coiled hose becoming of greater radius of curvature in response to inwardly directed force.

7. A reel for fire hose including a hollow hub having mounted thereon spaced heads and a plurality of resilient spring leaves arranged between the heads, each leaf normally extending substantially from one head to the other, each leaf being fixed at its inner edge to the hub, the opposite edge of the leaf being free to move, the leaves collectively constituting a support for a coiled hose, each leaf being arcuate and of variable radius with its convex surface outermost, the free edge of each leaf being arranged to slide along the convex outer surface of the underlying leaf in response to constrictive pressure exerted by a hose wound upon the drum.

8. A reel for fire hose including a hollow hub having mounted thereon spaced heads and a plurality of resilient spring leaves arranged between the heads, each leaf being fixed at its inner edge to the hub, the opposite edge of the leaf being free to move, the leaves collectively constituting a structure for supporting the coiled hose, each leaf being of resilient sheet material bent to a normal arcuate form, the outer edge of each leaf being shaped to form a bead which overlies the outer surface of the next adjacent leaf and slides along the outer surface of the underlying leaf when the arms are subjected to force directed toward the hub.

9. A hose reel comprising a hub journaled to turn on a fixed shaft carried by a supporting bracket, axially disposed heads mounted on the hub and slidable axially of the hub, a spring washer engaging each head and urging the heads toward each other but permitting relative separation of the heads in response to force urging them apart, and a hose-supporting structure interposed between the heads, said supporting structure consisting of a series of normally curved spring arms each fixed at its inner edge to the hub and having its outer edge free to move, each arm being so shaped that its free outer edge overlies the mid-portion of the next adjacent arm of the series.

10. In combination in a reel of the class described, a rotatable hub, a pair of axially spaced heads mounted on the hub, one at least of said heads being axially movable relatively to the hub, a spring washer urging such movable head toward the other, a series of spring arms each being a single piece of resilient sheet metal, each arm normally extending substantially from one head to the other, each arm being fixed at its inner edge to the hub, the arms being so shaped that the outer edge of each arm overlies the mid-portion of the next adjacent arm of the series, said outer edges being freely movable in or out, the outer surfaces of the several arms collectively constituting a support for the coiled hose.

11. A hose reel of the class described consisting of a rotary hub, axially spaced heads mounted on the hub and slidable along the latter, a unitary spring washer urging each head toward the other, and a series of unitary spring leaves interposed between the heads, each leaf normally extending substantially from one head to the other, and means fixing one edge of each leaf to the hub, the leaves being arcuate in shape with their convex surfaces outermost and with the outer edge of each leaf free to move in and out and overlying the convex surface of the next adjacent leaf of the series.

References Cited in the file of this patent

UNITED STATES PATENTS

| | | |
|---|---|---|
| 751,494 | Gally | Feb. 9, 1904 |
| 988,766 | Frigon | Apr. 4, 1911 |
| 1,839,339 | Peters | Jan. 5, 1932 |
| 1,962,513 | Lyon | June 12, 1934 |
| 1,971,165 | Parker | Aug. 21, 1934 |
| 2,059,741 | Mossberg | Nov. 3, 1936 |
| 2,426,984 | Craig | Sept. 9, 1947 |
| 2,533,432 | Clark | Dec. 12, 1950 |

FOREIGN PATENTS

| | | |
|---|---|---|
| 692,548 | France | Aug. 4, 1930 |
| 574,056 | Germany | Apr. 8, 1933 |